US010633195B2

(12) United States Patent
Gadliger (10) Patent No.: US 10,633,195 B2
(45) Date of Patent: Apr. 28, 2020

(54) DEVICE FOR LOADING AND UNLOADING RAIL-GUIDED SUSPENDED CONVEYOR SYSTEMS

(71) Applicant: FERAG AG, Hinwil (CH)

(72) Inventor: Urs Gadliger, Einsiedeln (CH)

(73) Assignee: FERAG AG, Hinwil (CH)

( * ) Notice: Subject to any disclaimer, the term of this patent is extended or adjusted under 35 U.S.C. 154(b) by 0 days.

(21) Appl. No.: 16/209,717

(22) Filed: Dec. 4, 2018

(65) Prior Publication Data

US 2019/0168972 A1 Jun. 6, 2019

(30) Foreign Application Priority Data

Dec. 4, 2017 (CH) ...................................... 1470/17

(51) Int. Cl.
*B65G 47/61* (2006.01)
*B65G 47/84* (2006.01)
(Continued)

(52) U.S. Cl.
CPC ............. *B65G 47/61* (2013.01); *B65G 9/004* (2013.01); *B65G 47/57* (2013.01); *B65G 47/841* (2013.01);
(Continued)

(58) Field of Classification Search
CPC ........ B65G 9/004; B65G 47/57; B65G 47/61; B65G 47/841; B65G 2201/0288; B65G 17/20
See application file for complete search history.

(56) References Cited

U.S. PATENT DOCUMENTS 4,201,286 A * 5/1980 Meier .................. B65H 29/003
198/461.3
4,956,001 A 9/1990 Kitagawa et al.
(Continued)

FOREIGN PATENT DOCUMENTS

DE       196 38 356 A1    4/1998
DE  10 2013 104 423 A1   10/2014
(Continued)

OTHER PUBLICATIONS

EPO, Form EPO Form 1503 03.82, Extended EP Search Report for European Patent Application EP 18 20 9311, dated Apr. 30, 2019 (5 pp.) together with EPA Form 1703 01.91TRI (7 pp.).

*Primary Examiner* — Gene O Crawford
*Assistant Examiner* — Keith R Campbell
(74) *Attorney, Agent, or Firm* — Pauley Erickson & Kottis (57) ABSTRACT

A system for transferring units to/from a rail-guided suspended conveyor system includes a transfer conveying device with one or more first conveying units and a conveyor system with a plurality of second conveying units. The first and second conveying units each have a rack with tines and form a receptacle for bearing a unit. The system is configured such that in a transfer zone a rack of a first conveying unit of the transfer device and a rack of a second conveying unit of the conveyor system penetrate by meshing so with movement of the first and the second conveying unit relative to another either a unit initially on the rack of the first conveying unit remains on the rack of the second conveying unit, or a unit initially on the rack of the second conveying unit remains on the rack of the first conveying unit.

19 Claims, 7 Drawing Sheets

(51) Int. Cl.
  *B65G 9/00* (2006.01)
  *B65G 47/57* (2006.01)
  *B65G 17/20* (2006.01)

(52) U.S. Cl.
  CPC ...... *B65G 17/20* (2013.01); *B65G 2201/0288* (2013.01)

(56) References Cited

U.S. PATENT DOCUMENTS

| | | | | |
|---|---|---|---|---|
| 5,125,500 | A * | 6/1992 | Cailbault | B07C 3/082 198/470.1 |
| 6,851,544 | B2 * | 2/2005 | Noll, Jr. | B65H 29/06 198/470.1 |
| 8,376,348 | B2 * | 2/2013 | Keller | B65H 29/003 271/204 |
| 8,770,385 | B2 * | 7/2014 | Hannessen | B65G 17/123 198/607 |
| 9,199,796 | B2 * | 12/2015 | Fenile | B65G 47/82 |
| 2004/0247416 | A1 | 12/2004 | Komatsu et al. | |
| 2005/0269765 | A1 | 12/2005 | Widmer et al. | |
| 2009/0026041 | A1 | 1/2009 | Schaefer | |
| 2014/0017057 | A1 * | 1/2014 | Haehnel | B65G 57/03 414/790 |
| 2016/0318720 | A1 | 11/2016 | Roos et al. | |
| 2018/0215547 | A1 | 8/2018 | Fenile et al. | |

FOREIGN PATENT DOCUMENTS

| | | |
|---|---|---|
| EP | 0 609 669 A1 | 8/1994 |
| EP | 2 138 629 A1 | 12/2009 |
| JP | S599313 A | 1/1984 |
| JP | H02-57933 U | 4/1990 |
| JP | H07-125814 A | 5/1995 |
| JP | 2016504154 A | 2/2016 |
| JP | 2016-210616 A | 12/2016 |
| NL | 294990 | 6/1964 |
| WO | WO 2012/155169 A1 | 11/2012 |
| WO | WO 2013/006879 A2 | 1/2013 |
| WO | WO 2014/191162 A1 | 12/2014 |
| WO | WO 2016/030275 A1 | 3/2016 |

* cited by examiner

DEVICE FOR LOADING AND UNLOADING RAIL-GUIDED SUSPENDED CONVEYOR SYSTEMS

CROSS-REFERENCE TO RELATED APPLICATIONS

Swiss Patent Application 01470/17, filed 4 Dec. 2017, the priority document corresponding to this invention, to which a foreign priority benefit is claimed under Title 35, United States Code, Section 119, and its entire teachings are incorporated, by reference, into this specification.

BACKGROUND OF THE INVENTION

Field of the Invention

The present invention relates to the field of transport and conveying technology. It relates to a system for transferring individual piece-good units to and/or from conveying units of a rail-guided suspended conveyor system. It further relates to a conveying unit for a suspended conveyor system and a method for transferring individual piece-good units to and/or from conveying units of a suspended conveyor system.

Discussion of Related Art

In the case of automated warehouses, large production facilities and generally in the conveyance and the transport of individual items, rail-guided suspended conveyor systems have proved to be an efficient means for the transport, intermediate buffering but also long-term storage of different types of individual items. In suspended conveyor systems the individual items are either directly suspended in an appropriate manner on individual conveying units of a conveyor system or introduced into corresponding receiving devices which in turn are mounted so as to be suspended on the conveying units.

In this context, generally individually transportable units are understood as individual items, such as for example workpieces, semi-finished products and manufactured products in production processes, spare parts, consumer goods, batches of stackable goods, for example batches of printed products, but also receptacles and transport carriers for goods, such as for example boxes, containers, items of luggage, drums, packets, pallets, etc.

Rail-guided suspended conveyor systems may be implemented as chain conveyor systems, in which a plurality of conveying units which form the links of a chain are moved along a conveying path.

Rail-guided suspended conveyor systems with individually conveyable transport units are also known. Thus for example WO 2016/030275 A1, also published as US 2018/215547 A1, discloses a gravity-fed conveyor system in which individual conveying units provided with wheels move on corresponding running rails. Diverter systems permit a targeted distribution of individual conveying units, which may be designed for example as carriages, on various conveying paths and/or permit the conveying units to be combined on a common conveying path. Accumulation sections permit the buffering or storage of a plurality of carriages with minimal spacing. Separating systems in turn permit the targeted release of accumulated conveying units. The conveying units may be conveyed in an energy-efficient manner by means of gravity, on downwardly inclined conveying sections. On horizontal and upwardly inclined conveying sections, the conveying units may be reversibly coupled to drive devices such as for example chain drives or worm drives in order to overcome height differences or to achieve a conveyance in a specific region of the conveying path at timed intervals.

Suspended conveyor systems permit the mounting of a large proportion of the conveyor system overhead on the ceiling, so that the floor area remains free for production facilities and other devices. For the storage, the removal from storage or the processing of items, however, the conveying path has to be moved to a lower level and/or guided upwardly again, which due to the restricted gradient angle of rail-guided suspended conveyor systems requires a significant amount of floor area and spatial volume which could be used in other ways.

Suspended conveyor systems with transport units are particularly suitable for the efficient conveyance of homogenous individual items. Thus, for example, in logistics centers of mail-order companies, such suspended conveyor systems may be used in order to store a plurality of articles of different sizes and weights and to pick batches of articles according to the respective customer orders and to prepare these articles for shipping. A further application field is the conveyance and storage of intermediate products and/or end products in printing production processes.

A relevant feature for a suspended conveyor system in this case is the simple frictionless and efficient introduction of individual items into empty transport units and the removal of the individual items from the transport units, and also an efficient transfer between different conveyor systems and a small requirement for spatial volume and floor area.

WO 2014/191162 A1 discloses a system for sorting items of luggage in a belt conveyor-based luggage transport system of an airport. The sorting system comprises a continuously circulating paternoster device with a plurality of circulating transport units, in each case consisting of a horizontal belt conveyor table. An item of luggage to be sorted is supplied onto a belt conveyor of the sorting device and transferred via a pivotable transfer belt conveyor to a transport unit which is moving past. During the transfer, the belt conveyor of the corresponding transport unit runs synchronously with the transfer belt conveyor. After the transfer has been carried out, the belt conveyor of the transport unit is stopped and the item of luggage is moved with the transport unit. The item of luggage may similarly be discharged to one of a plurality of receiving-belt conveyors, whereby sorting is carried out. In functional terms the system corresponds to a multiple diverter for belt conveyors with a plurality of possible inlets and outlets.

WO 2012/155169 A1 and WO 2013/006879 A2 disclose rack storage systems in which storage containers with a continuously circulating paternoster device comprising a plurality of circulating transport units may be introduced into the desired plane of the rack store and removed therefrom. The transport units in each case consist of a rack with three to four tines which is continuously held horizontally, the storage container bearing thereon during the conveyance. The tines of the rack are aligned parallel or perpendicular to the circulating plane of the paternoster device and form a continuously horizontal plane. In order to receive a storage container from an external belt conveyor into a transport unit, or to discharge this storage container from the transport unit to an external belt conveyor, a conveying unit is provided, said conveying unit comprising a plurality of parallel belt conveyors or a roller conveyor with parallel rollers which cooperate by meshing with the tines of the transport unit. If a loaded transport unit moves past the conveying unit, meshing from above, the storage container remains positioned on the conveying unit. This conveying unit subsequently conveys the storage container via the belt conveyor and/or roller conveyor onto an external belt conveyor. An exchange of the storage containers between the external belt conveyors and the paternoster device is only possible in the vertically extending portions of the conveying path of the paternoster device. So that a plurality of external belt conveyors may be operated, the conveying units which are not required have to be pivoted away out of the conveying path.

DE 102013104423 A1 discloses a similar device for the transfer of an individual item from a first belt conveyor or a vehicle onto a second belt conveyor located thereabove, in which three transport blades with a rack base are arranged so as to be continuously aligned horizontally on a vertical carousel. A conveying unit which cooperates by meshing with the horizontal rack base of the transport blades receives the individual item, by means of parallel narrow belt conveyors, from a transport blade pivoting past from above and conveys the individual item onto the external belt conveyor. Due to its design, the aforementioned device requires a significant spatial volume relative to the height difference which has been overcome.

The aforementioned devices require a plurality of costly driven and/or moved supply and discharge devices. A transfer of individual items is only possible on belt conveyor-based conveyor systems or conveyor vehicles.

Generally, there is a need for improvements in this field of technology.

SUMMARY OF THE INVENTION

It is the object of the invention to provide a system for transferring individual piece-good units to and/or from conveying units of a rail-guided suspended conveyor system, which does not have the aforementioned and other drawbacks. In particular, such a system is intended to permit an efficient transfer of individual items to a rail-guided suspended conveyor system and/or an efficient receiving of individual items from rail-guided suspended conveyor systems.

A further object of the invention is to provide an advantageous conveying unit for a suspended conveyor system which, in particular, may be used in a system according to the invention.

A further object of the invention is to provide an advantageous method for transferring individual piece-good units to and/or from conveying units of a suspended conveyor system, which permits an efficient transfer of individual items on suspended conveyor systems and/or an efficient reception of individual items from suspended conveyor systems.

These and other objects are achieved by a system according to the invention for transferring individual piece-good units to and/or from conveying units of a rail-guided suspended conveyor system, a conveying unit according to the invention for a rail-guided suspended conveyor system and a method for transferring individual piece-good units to and/or from conveying units of a rail-guided suspended conveyor system, according to the independent claims. Further advantageous embodiments are disclosed in the dependent claims.

The solution according to the invention may be further improved by different embodiments, which in each case are advantageous per se and which may be combined together in any manner unless indicated otherwise. Details will be provided about these embodiments and the advantages associated therewith hereinafter.

A first aspect of the disclosure relates to a system for transferring individual piece-good units to and/or from conveying units of a rail-guided suspended conveyor system, in particular an individual carriage-based suspended conveyor system or a conveyor-chain system.

A system according to the invention for transferring individual piece-good units to and/or from conveying units of a rail-guided suspended conveyor system comprises at least one transfer conveying device with one or more first conveying units, wherein the individual first conveying units have a rack with a plurality of tines which form a receptacle for bearing an individual piece-good unit; and a suspended conveyor system with a plurality of second conveying units, wherein the individual second conveying units have a rack with a plurality of tines which form a receptacle for bearing an individual piece-good unit. The at least one transfer conveying device and the suspended conveyor system are designed such that in a transfer zone a rack of a first conveying unit of the transfer conveying device and a rack of a second conveying unit of the suspended conveyor system penetrate one another by meshing so that with a movement of the first and the second conveying unit relative to one another either an individual piece-good unit initially borne on the rack of the first conveying unit remains on the rack of the second conveying unit, or an individual piece-good unit initially borne on the rack of the second conveying unit remains on the rack of the first conveying unit.

The receptacle of the first conveying units and/or the receptacle of the second conveying units may be designed as at least one wall or as an indentation.

The racks of the first conveying units may, for example, have five individual tines. The number of tines, however, may also be smaller, a minimum of two, or greater, wherein the number is dictated by the actual dimensioning of the system, for example the width of the conveying units, by the conveying units of a suspended conveyor system cooperating therewith, but also by the type of individual piece-good units to be transported.

Advantageously, in a system according to the invention the second conveying units of the suspended conveyor system are able to be conveyed individually, independently of other second conveying units.

Advantageously, in a system according to the invention the first conveying units move along a closed conveying path, wherein a portion of this conveying path corresponds to the transfer zone.

Alternatively, or additionally, the first conveying units may move on a conveying path between the transfer zone and at least one further zone.

In an advantageous variant of such a system according to the invention, in the transfer zone the conveying path of the first conveying units and the conveying path of the second conveying units run in one plane. Particularly advantageously, in the transfer zone the conveying path of the first conveying units and the conveying path of the second conveying units run in a common plane.

In an advantageous embodiment of a system according to the invention, the at least one transfer conveying device comprises means for altering the alignment of the rack of a first conveying unit relative to the vertical.

In a further advantageous embodiment of a system according to the invention, the at least one transfer conveying device comprises means for controlling the alignment of the rack of a first conveying unit. Particularly advantageously, in this case the alignment of the rack is controlled according to the position of the first conveying unit on the conveying path.

In a further advantageous embodiment of a system according to the invention, the tines of the rack of a first conveying unit are arranged fixedly in terms of rotation on a pivot pin of the first conveying unit; and the transfer conveying device comprises two closed drive chains guided in parallel, rotary bearings opposing one another in pairs being arranged thereon, and in each case the pivot pin of a conveying unit being rotatably mounted in said rotary bearings. Particularly advantageously, in such an embodiment the first conveying units of the at least one transfer conveying device, at one or both ends of the pivot pin, have a control lever which is operatively connected to the pivot pin and which cooperates with control means of the transfer conveying device. For example, a slide guide or an actuator may be used in order to control the alignment of the rack of the first conveying units.

In the transfer zone, the rack of the first conveying units is advantageously aligned such that the walls of the rack are aligned parallel to the walls of the second conveying units of the suspended conveyor system. In a further region of the conveying path of the transfer conveying device, the racks may be aligned by, for example, a corresponding positioning of a guide slide so that a wall is aligned horizontally in order to receive an individual piece-good unit from a horizontal belt conveyor or to be able to transfer an individual piece-good unit to a horizontal belt conveyor. Also possible is an active control of the alignment of the racks, for example by actuators being provided, said actuators if required altering a guide slide, for example by displacing the guide slide.

The suspended conveyor system of a system according to the invention may comprise means for altering the alignment of the rack of a second conveying unit relative to the vertical.

The suspended conveyor system of a system according to the invention may further comprise means for controlling the alignment of the rack of a second conveying unit. Advantageously, the control of the alignment of the rack is carried out according to the position of the second conveying unit on the conveying path.

In a further advantageous embodiment of a system according to the invention, the second conveying units of the suspended conveyor system comprise means for the clamped retention of an individual piece-good unit borne therein. Particularly advantageously, the suspended conveyor system comprises means for locking and unlocking the means for the clamped retention.

The suspended conveyor system of a system according to the invention may comprise means which, in a transfer zone of the conveying path of the second conveying units, fix the alignment of the second conveying units relative to the conveying path. During the transfer of the individual piece-good unit, this permits an exact alignment of the two conveying units relative to one another.

In an advantageous variant of a system according to the invention, the tines of the racks of the first conveying units and/or the tines of the racks of the second conveying units in each case form a first wall and a second wall which are located at an angle of <180° to one another.

The angle is advantageously 90° or more in order to prevent the jamming of individual piece-good units borne in the rack. For individual items with special shapes, for example spheres or cylinders, the tines may be designed such that when combined together a non-planar bearing surface is formed, for example an indentation in the shape of the type of individual item to be transported, or a rounded transition between the two walls.

The tines of the first conveying units and/or the second conveying units may be configured, for example, as metal elements, for example metal plates, whereby the bearing surface of the rack is produced from the combined edges. Additional flat elements may also be provided, for example metal strips or edge beads, which raise the bearing surface. The tines may be planar on the side of the bearing surfaces or have a structure which, for example, increases the adhesion. The static friction may also be reduced, for example, by sliding surfaces made of HDPE or PTFE. Also possible is the arrangement of rollers with one roller on the bearing surfaces of the tines. The tines in turn may also be designed as longitudinal rollers rotating along a tine axis. The aforementioned rollers may be freely rotating and/or driven. Alternatively, the tines may also comprise in each case a narrow belt conveyor.

Advantageously, the at least one transfer conveying device is designed such that, in at least one region of the conveying paths of the first conveying units and the second conveying units, the first wall of the rack of a first conveying unit is parallel with the first wall of the rack of a second conveying unit. Particularly advantageously, the aforementioned at least one region of the conveying paths of the first conveying units and the second conveying units is located in a transfer zone of the system according to the invention.

In a system according to the invention, advantageously the at least one transfer conveying device is designed such that on at least one point of the conveying path of the first conveying units the first wall of the rack of a first conveying unit is horizontal.

In an advantageous variant of a system according to the invention, a further conveying device is provided, said further conveying device at an end facing the transfer conveying device being formed from a plurality of belt conveyors running in parallel or a roller conveyor with spaced-apart parallel rollers which are located in the conveying path of the first conveying unit and cooperate by meshing with the racks of the first conveying units, so that if a first conveying unit passes the further conveying device the rack of the first conveying unit penetrates the belt conveyors running in parallel and/or the spaced-apart parallel rollers of the roller conveyor of the aforementioned further conveying device.

A second aspect of the disclosure relates to a transfer conveying device for the vertical transport of individual piece-good units between a first zone and at least one second zone located thereunder. Such a transfer conveying device may be advantageously used, in particular, in a system according to the invention as has been discussed above.

Such an advantageous transfer conveying device for the vertical transport of individual piece-good units between a first zone and at least one second zone located thereunder has one or more conveying units, wherein the individual conveying units have a rack with a plurality of tines which form at least one first wall and a second wall for bearing an individual piece-good unit, said walls being located at an angle of <180° to one another, in particular at a right angle or an obtuse angle.

Advantageously, in such a transfer conveying device the conveying units move along a closed conveying path, wherein specific portions of the conveying path correspond to the different zones.

Alternatively, or additionally, the conveying units may move on a conveying path between the first zone and at least one further second zone.

Advantageously, in such a transfer conveying device means are provided for altering the alignment of the rack of a conveying unit relative to the vertical.

Advantageously, in such a transfer conveying device means may also be provided for controlling the alignment of the rack of a conveying unit, particularly advantageously according to the position on the conveying path.

The tines of the rack of a conveying unit of a transfer conveying device are advantageously arranged fixedly in terms of rotation on a pivot pin of the conveying unit; and the device has two closed drive chains guided in parallel, rotary bearings opposing one another in pairs being arranged thereon, in each case the pivot pin of a conveying unit being rotatably mounted in said rotary bearings.

Particularly advantageously, in this case the conveying units have at one or both ends of the pivot pin a control lever which is operatively connected to the pivot pin and which cooperates with control means of the transfer conveying device, for example a slide guide or an actuator in order to control the alignment of the rack.

A third aspect of the disclosure relates to a conveying unit for a rail-guided suspended conveyor system, in particular an individual carriage-based suspended conveyor system or a conveyor-chain system.

A conveying unit according to the invention for a rail-guided suspended conveyor system comprises a supporting structure and a rack for the transport of an individual piece-good unit to be conveyed, comprising a plurality of tines which form a receptacle for bearing the individual piece-good unit to be conveyed, wherein the conveying unit comprises means for the clamped retention of an individual piece-good unit conveyed in the receptacle.

The receptacle may be configured as at least one planar wall or as an indentation.

In an advantageous embodiment of a conveying unit according to the invention, the tines of the rack form a first wall and a second wall which are located at an angle of <180° to one another, in particular at a right angle or an obtuse angle.

A fourth aspect of the disclosure relates to a method for transferring individual piece-good units to and/or from conveying units of a rail-guided suspended conveyor system, in particular an individual carriage-based suspended conveyor system or a conveyor-chain system.

A method according to the invention for transferring individual piece-good units to and/or from conveying units of a rail-guided suspended conveyor system comprises the steps:
  providing a transfer system according to the invention as explained above;
  positioning a second conveying unit of the suspended conveyor system in a transfer zone of the conveying path of the second conveying units;
  moving a first conveying unit of the transfer conveying device into a transfer zone of the conveying path of the first conveying units; and
  mutual penetration by meshing of the rack of the first conveying unit and the rack of the second conveying unit,
wherein for transferring an individual piece-good unit borne on the rack of the first conveying unit onto the rack of the second conveying unit, the rack of the first conveying unit penetrates the rack of the second conveying unit from top to bottom in the direction of gravity; and/or for transferring an individual piece-good unit borne on the rack of the second conveying unit onto the rack of the first conveying unit, the rack of the first conveying unit penetrates the rack of the second conveying unit counter to the direction of gravity from bottom to top.

In a method according to the invention, advantageously a second conveying unit is initially moved into the transfer zone and/or out of the transfer zone, when the first conveying units are in a position where a collision is not possible with one of the second conveying units of the suspended conveyor system.

In an advantageous variant of a method according to the invention, the first conveying units of the transport conveying device, after receiving an individual piece-good unit from the second conveying unit or after the transfer of the individual piece-good unit to the second conveying unit, remain in a secure position where a collision is not possible with the aforementioned second conveying unit. The aforementioned second conveying unit is then guided away out of the transfer zone.

In a further advantageous variant of a method according to the invention, before a second conveying unit is supplied into the transfer zone, the first conveying units of the transfer conveying device remain in a secure position in which a collision with the aforementioned second conveying unit is not possible.

In one possible advantageous variant of the method according to the invention, during the transfer of an individual piece-good unit the second conveying unit is not moved in the transfer zone. This has the advantage that, by the temporary spatial fixing of the second conveying unit, the precise relative orientation of the first conveying unit and the second conveying unit during the transfer may be achieved in a simple and reliable manner.

In a further possible advantageous variant of the method according to the invention, during the transfer of an individual piece-good unit the second conveying unit also moves in the conveying direction along its conveying path in the transfer zone. Such a variant permits more rapid cycle rates since the second conveying units do not have to be stopped. In order to ensure an accurate relative orientation of the first conveying unit and the second conveying unit during the transfer, the movements of the two conveying units have to be accurately controlled which sets greater requirements for the control.

In a particularly advantageous variant of the aforementioned method according to the invention, during the transfer of an individual piece-good unit the second conveying unit and the first conveying unit are moved in a common direction of conveyance, wherein the receiving conveying unit passes the transfer conveying unit. Such a variant permits a transfer with a greater conveying speed of the second conveying units since the relative speed differences between the first conveying unit and the second conveying unit are small.

BRIEF DESCRIPTION OF SEVERAL VIEWS OF THE DRAWINGS

For improved understanding of the present invention, reference is made hereinafter to the drawings. These drawings show only exemplary embodiments of the subject of the invention, which do not limit the invention to the features disclosed therein. The same or similar reference numerals are used for the same or similar-acting parts in the figures and the accompanying description.

DETAILED DESCRIPTION OF THE INVENTION

Figure 1:
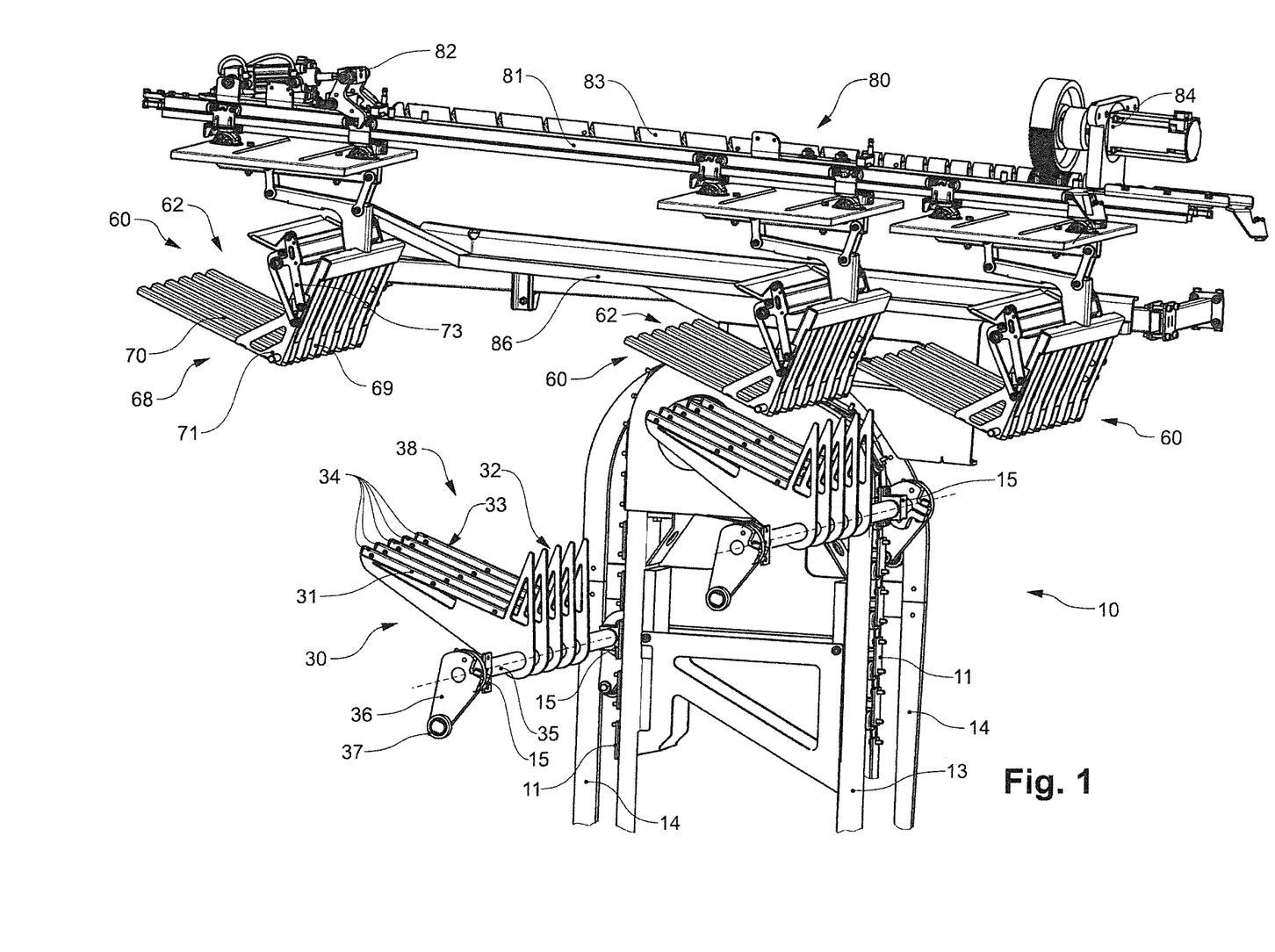
FIG. 1 shows a perspective view of the transfer zone of a possible embodiment of a transfer system according to the invention.
Figure 2A:
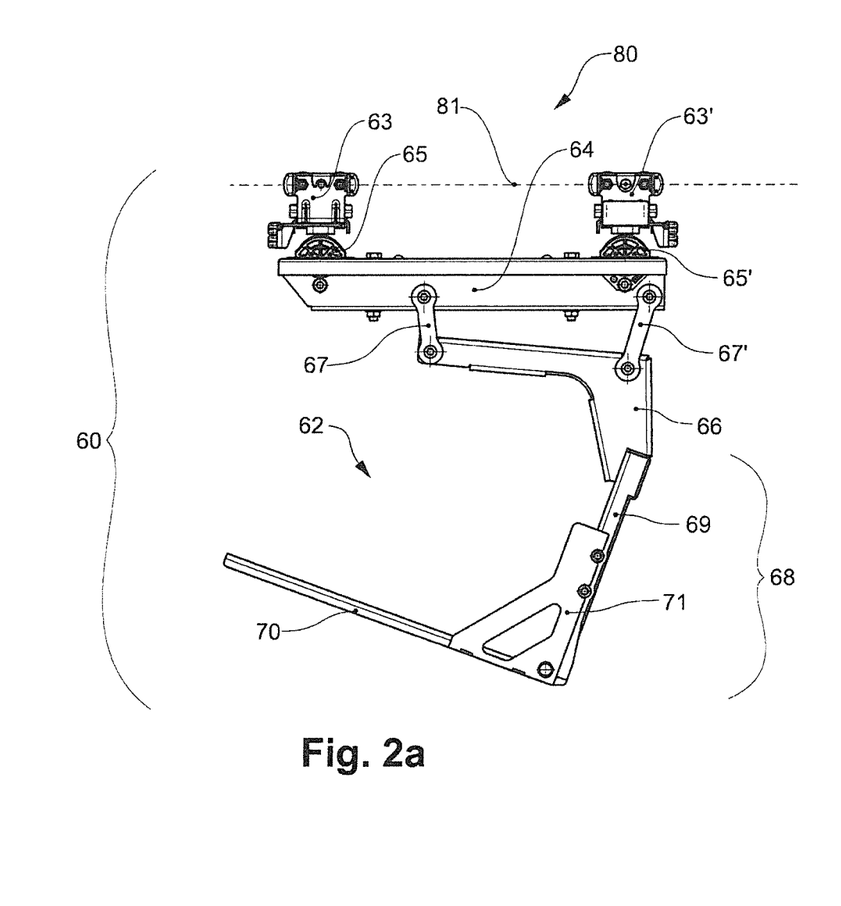
FIG. 2a shows an embodiment of a conveying unit of a suspended conveyor system for use in a transfer system according to the invention as shown in FIG. 1 in side view.
Figure 2B:
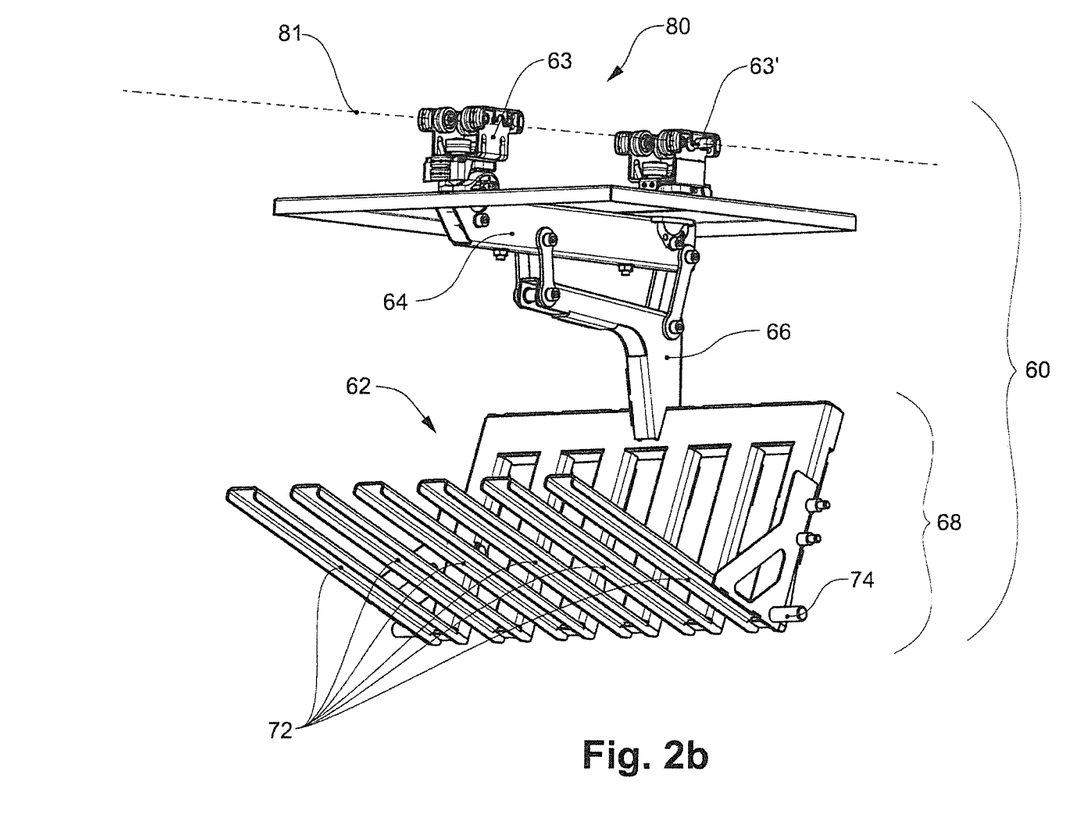
FIG. 2b shows an embodiment of a conveying unit of a suspended conveyor system for use in a transfer system according to the invention as shown in FIG. 1 in perspective view.
Figure 3:
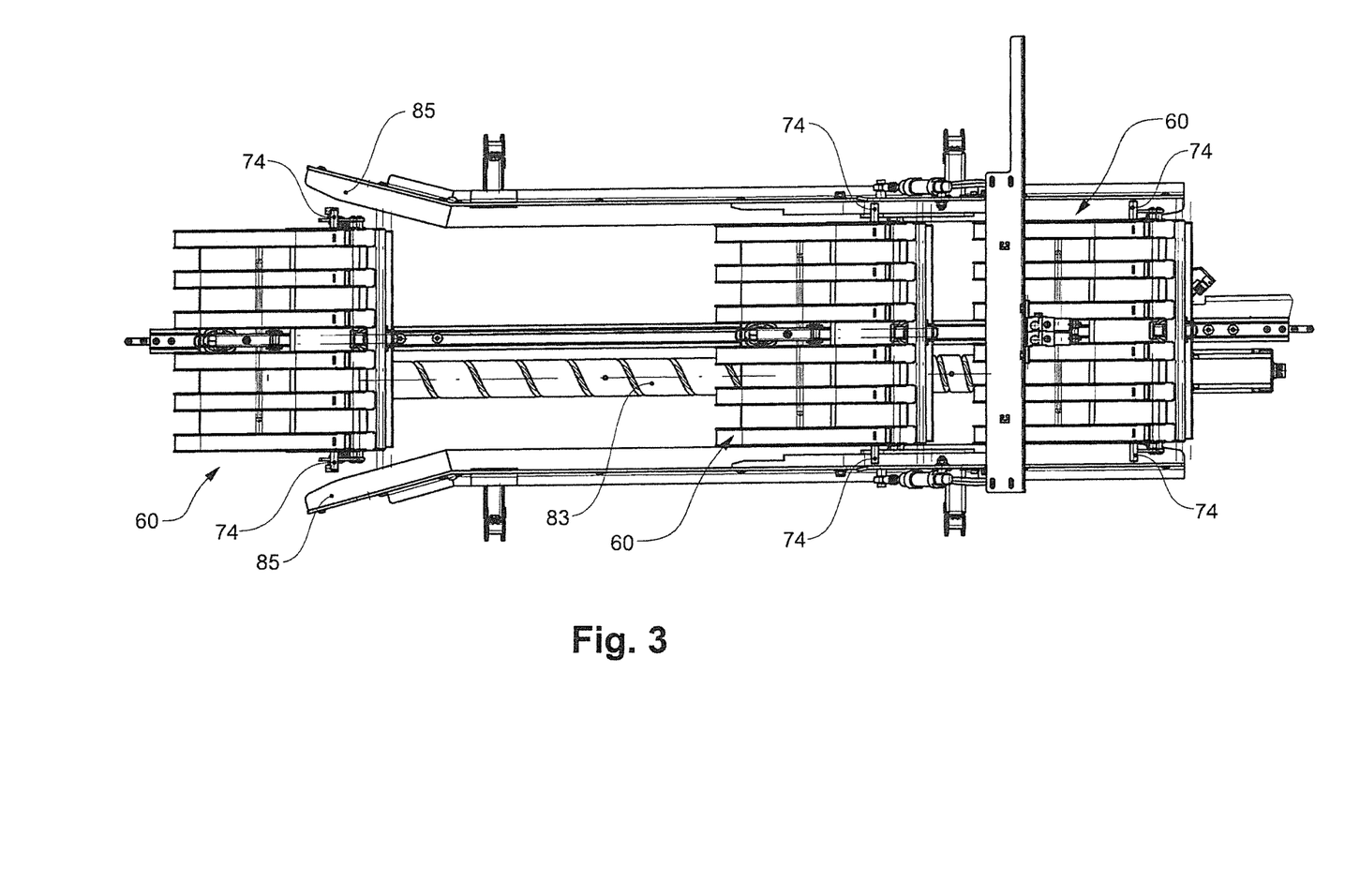
FIG. 3 shows the transfer zone of the suspended conveyor system as shown in FIG. 1 in a view from below.

An advantageous exemplary embodiment of a system according to the invention for transferring individual piece-good units to and/or from conveying units of a suspended conveyor system is shown in FIGS. 1 and 3. The construction of the advantageous conveying units of the suspended conveyor system is shown in FIGS. 2a and 2b. FIG. 1 shows in this case a partial view of a transfer conveying device 10 according to the invention for the vertical transport of individual piece-good units, with conveying units 30 of the transfer conveying device. An upper region of the transfer conveying device may be seen, namely the region in a transfer zone 5 in which the transfer takes place from or to a suspended conveyor system 80. Moreover, a portion of a suspended conveyor system 80 in the transfer zone 5 is shown. For an improved overview, a front half of the transfer conveying device 10 and of the suspended conveyor system 80 are omitted in the drawing. FIG. 3 shows the portion of the suspended conveyor system 80 with a view from below of the transfer zone.

The transfer conveying device 10 comprises two parallel drive chains 11 (one thereof being visible) which are arranged so as to circulate in a closed manner on a supporting structure 13 on corresponding wheels and rollers (not shown). A drive and a controller, not shown, permit a controlled movement of the conveying units 30 in both possible conveying directions. In each case rotary bearings 15 opposing one another in pairs are attached to specific chain links of the two drive chains 11. In each case a pivot pin 35 of a conveying unit 30 is rotatably mounted in these pairs of rotary bearings 15. The rack 31 of the conveying unit 30 is fastened fixedly in terms of rotation to the pivot pin 35. The rack 31 consists of a plurality of individual substantially identical tines 34 which are arranged spaced-apart from one another on the pivot pin 35. The tines 34 are angled such that combined together all of the tines produce two planar walls 32, 33 on which an individual piece-good unit may be positioned and/or may bear. The two walls 32, 33 of the rack 31 form a right-angle which is advantageous for substantially cuboidal individual piece-good units but is also functional for other shapes of individual items.

The pivot pin 35 of the conveying units 30 protrudes on both sides beyond the two rotary bearings 15 on the drive chain 11. In each case a control lever 36 is arranged at the two ends of the pivot pin 35, said control lever comprising a sliding block 37 in the form of a rotatably mounted wheel. The sliding block runs in a slide consisting of two guide structures which form between one another a guide channel of the slide, wherein due to the viewing angle only one external guide structure 14 of the slide is visible in the view. The guide slide 14 permits the fixing of the alignment of the rack 31 relative to the pivot pin 35 and also absorbs a part of the weight force of the conveying units and their contents. In the exemplary embodiment of FIG. 1, in the region of the transfer zone shown, the rack 31 of the conveying units 30 is aligned such that the walls 32, 33 are oriented parallel to the walls 69, 70 of the conveying units 60 of the suspended conveyor system 80.

In the exemplary embodiment shown, a conveying unit 60 of the suspended conveyor system according to the invention comprises two carriages 63, 63' which run in the running rail 81 of the suspended conveyor system 80. The two carriages 63, 63' are pivotably connected via first suspensions 65, 65' to a first support structure 64. Via second suspensions 67, 67' a second support structure 66 is pivotably connected to the first support structure 64, said second support structure in turn bearing the rack 68.

The rack 68 consists of six tines 72 in the form of angled U-shaped profiles which are connected via a cross-member to the second support structure 66. Two walls 69, 70 of the rack 68 are produced from the angle of the tines 72. Two side walls 71 are attached to the side, said side walls preventing the load from sliding out from the side, if applicable, during the rapid transport of a conveying unit 60 in the suspended conveyor system along a curved conveying path. Moreover, the side walls 71 serve for the fastening of a guide pin 74 which is described hereinafter in more detail. Also fastened to the side walls 71 is a clamping device 73 which during the transport of the conveying unit 60 in the suspended conveyor system 80 secures the borne individual piece-good unit from above. In FIGS. 2a and 2b, in this case only the two pivot pins of the suspension of the pivotable clamping device are shown of the aforementioned clamping device 73.

In the exemplary embodiment shown, the suspended conveyor system 80 is designed as a gravity-fed conveyor system with individually movable conveying units 60. Starting from the left, the conveying units 60 moving on a running rail 81 reach the transfer zone of the system by being gravity fed. A separating device 82 transfers a conveying unit 60 to a worm drive 83 with a motor 84, which moves the conveying unit 60 into a transfer position and temporarily fixes it there in the conveying direction. The worm drive 83 has two different helical pitches upstream and downstream of the transfer position so that, when replacing two conveying units 60, the new second conveying unit 60 is supplied from further to the left than it is guided away to the right. In this manner, the length of the worm drive between the separating mechanism 82 and the transfer to the free-running suspended conveyor system may be minimized.

In the drawing, the transfer position corresponds to the central conveying unit 60. A slide guide 85 guides two guide pins 74, which are attached laterally to the rack of the conveying unit 60, which in combination with guide plates 86 acting on an upper part of the rack 68 fixes the rack 68 in the lateral direction perpendicular to the conveying direction and ensures an exact alignment of the tines of the rack 68. The slide guide 85 also controls the angle of inclination of the rack 68 mounted in a pivotably suspended manner, since the alignment of the rack mounted in a suspended manner is dictated by the distance of the guide pin 74 from the running rail 81.

In this manner it may be achieved that the walls 69, 70 of the rack 68 of the conveying unit 60 of the suspended conveyor system 80 and the walls 32, 33 of the rack 31 of the conveying unit 30 of the transfer conveying device 10 are correctly aligned when transferred, in order to avoid a displacement of the transferred individual piece-good unit and to permit the racks 31, 68 of the two conveying units 30, 60 to penetrate one another by meshing in a simple manner.

If an individual piece-good unit is to be transferred from the transfer conveying device 10 to a conveying unit 60 of the suspended conveyor system 80, during the transfer the conveying units 30 of the transfer conveying device 10 are moved clockwise. The conveying unit 30 shown to the left, in this case with an individual piece-good unit (not shown) located on the rack 31 and to be transferred to the conveying unit 60, following the predetermined conveying path, would approach from top left the still unloaded temporarily fixed central conveying unit 60.

The rack 31 of the conveying unit 30 then penetrates the rack 68 of the conveying unit 60 and namely advantageously such that at the moment of the transfer the tines 34 of the rack 31 and the tines 72 of the rack 68 form a common bearing surface. If the conveying unit 30 now moves further, the individual piece-good unit remains on the rack 68 of the conveying unit 60. The transfer of the individual piece-good unit to the suspended conveyor system has taken place.

As soon as the conveying unit 30 has left the conveying path of the suspended conveyor system to the right, the loaded conveying unit 60 is moved further to the right and transferred to the following portion of the conveying path of the suspended conveyor system.

If, however, an individual piece-good unit is transferred from a conveying unit 60 of the suspended conveyor system 80 to the transfer conveying device 10, during the transfer the conveying units 30 of the transfer conveying device 10 move counterclockwise. The still unloaded conveying unit 30, shown to the right, would in this case following the predetermined conveying path, and approach from bottom right the fixed central conveying unit 60. The rack 31 of the conveying unit 30 then penetrates the rack 68 of the conveying unit 60 and namely advantageously such that at the moment of the transfer the tines 34 of the rack 31 and the tines 72 of the rack 68 form a common bearing surface. If the conveying unit 30 now moves further, the individual piece-good unit located previously on the rack 68 remains on the rack 31 of the conveying unit 30 and is conveyed away thereby. The transfer of the individual piece-good unit to the transfer conveying device 10 has taken place.

When the rack 31 has reached a position in which the ends of the tines of the rack 68 are no longer able to collide with the individual piece-good unit, i.e. when the lowest point of the rack 31 is above the end of the tines of the rack 68, the now loaded conveying unit 60 may be moved further to the right. In this case it has to be ensured that the conveying path of the suspended conveyor system is free, which may be achieved, for example, by a suitable choice of the conveying speed of the transfer conveying device 10 and the spacing of the successive conveying units 30.

The narrow lateral dimensions of the transfer conveying device with the substantially vertical conveyance of the individual piece-good units and a transfer which is level with the suspended conveyor system, leads to a substantially reduced requirement of floor area and spatial volume of a system according to the invention, compared with the prior art, where for loading and unloading conveying units of a suspended conveyor system initially the conveying units have to be conducted to a different lower level in order to be moved upwardly again after the load transfer has taken place. Due to the potentially restricted angle of elevation of the conveying path of a suspended conveyor system, substantially more floor area and spatial volume is required in this case.

The system according to the invention also makes it possible, using the same system, to supply individual piece-good units into a suspended conveyor system and also to remove individual piece-good units from the suspended conveyor system without structural adaptations, merely by altering the conveying direction and reconfiguring the control of the drive means and actuators. A system according to the invention may thus be used in a more flexible manner.

The mode of operation of a system according to the invention is described in a stepwise manner in FIGS. 4a to 4i, in the example of a continuous transfer of individual piece-good units 2, 2', 2" from a suspended conveyor system 80 to a transfer conveying device 10 and from there to a further conveying device 90. The individual elements are in this case shown only schematically.

For example, one application may be a production system for books in which books of a minimum of just one copy are printed using rapid digital printers and prepared as folded book blocks, in order subsequently in further production steps to be provided with a dust jacket, to be trimmed, packaged and shipped. For simplifying the complex logistics process for the production of many different products, with in some cases very small batch sizes, it is advantageous to transfer individual book blocks or stacks of identical book blocks into a suspended conveyor system and thus to convey them to the processing system, which is designed to carry out the subsequent production step. Since the suspended conveyor system may contain buffer zones, printing and post-treatment may be decoupled, which permits an optimizing of the individual productions steps without affecting other production steps but may also encompass a temporary stoppage of individual processing systems. Suspended conveyor systems may also contain subsidiary storage systems which permits a further optimizing of the performance of the entire system. A common suspended conveyor system may be used for the different products and intermediate products. Thus, for example, book blocks and finished books may be conveyed via the same suspended conveyor system to the correct destination.

Figure 4A:
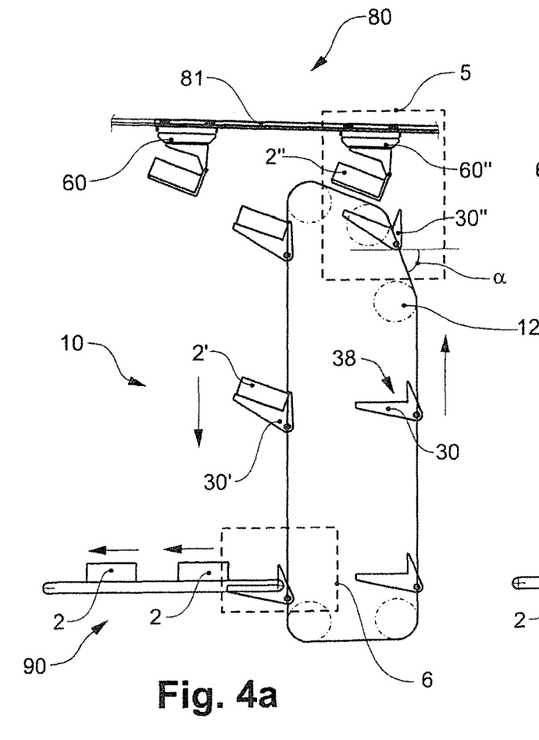
FIG. 4a shows schematically the stepwise sequence of the receiving of an individual piece-good unit from a suspended conveyor system in a transfer system according to the invention and the discharge to a secondary conveyor system.

FIG. 4a shows a first phase of a transfer process. A circulating conveying chain comprises a plurality of first conveying units and is supported by deflection rollers 12. The second conveying unit 60" of the suspended conveyor system 80, which has been moved previously from the left in a first transfer zone 5 to the transfer position, is loaded with an individual piece-good unit 2", in the exemplary application cited above a stack of a plurality of book blocks, for example, which has been previously supplied to the suspended conveyor system. From bottom right, a first conveying unit 30" approaches the transfer conveying device 10 at an acute angle α.

At the same time, downstream thereof, two already loaded 2' first conveying units 30' move vertically down in the direction of a second transfer zone 6, and two individual piece-good units 2 are conveyed away to the left on a belt conveyor 90 for further processing, for example, to a machine which provides the book blocks with a dust jacket.

During the receiving by the second conveying unit 60" and the subsequent transport downwards to the second transfer zone 6, the racks of the first conveying units 30', 30" are aligned such that the individual piece-good units are retained securely in the angle of the two walls of the rack.

Figure 4B:
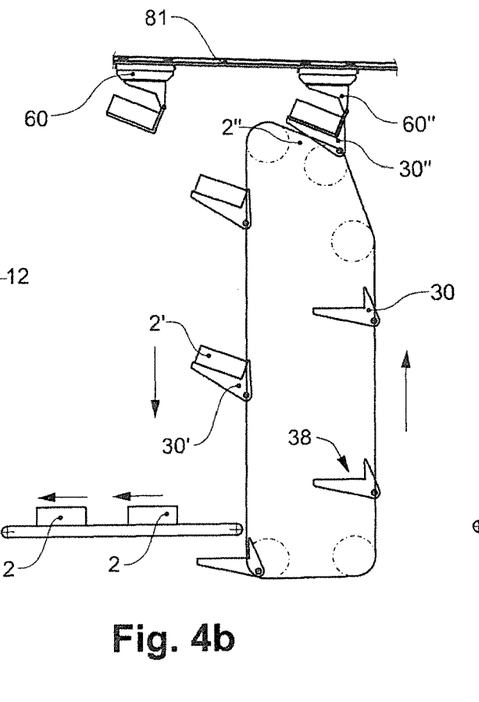
FIG. 4b shows schematically the stepwise sequence of the receiving of an individual piece-good unit from a suspended conveyor system in a transfer system according to the invention and the discharge to a secondary conveyor system.

FIG. 4b shows a second phase of a transfer process according to the invention. The first conveying unit 30" has reached the second conveying unit 60" which is fixed in the transfer position. The racks of the two conveying units penetrate one another by meshing and all of the tines form a common surface on which the individual piece-good unit 2" bears.

Figure 4C:
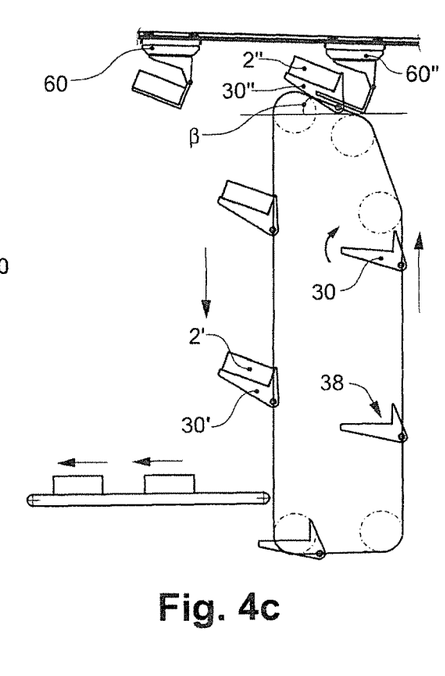
FIG. 4c shows schematically the stepwise sequence of the receiving of an individual piece-good unit from a suspended conveyor system in a transfer system according to the invention and the discharge to a secondary conveyor system.

FIG. 4c shows a third phase of a transfer process according to the invention. The first conveying unit 30" has raised the individual piece-good unit 2" from the second conveying unit 60" and guides it away to the left. In order to minimize the space requirement vertically, in this case the first conveying unit 30" is moved parallel to the tines of the second conveying unit 60", with an ascending angle β, wherein β<α. The first conveying unit 30 approaches the first transfer zone 5 and starts to be inclined to the rear from the horizontal due to the control guide (not shown).

Figure 4D:
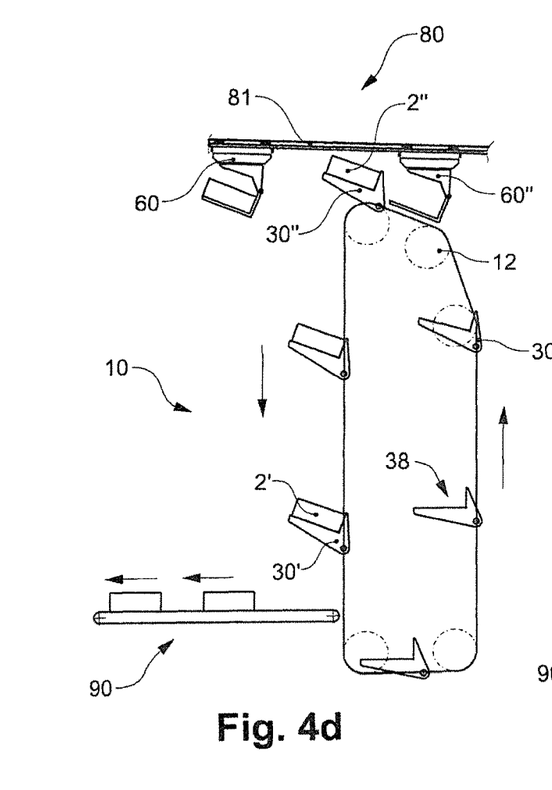
FIG. 4d shows schematically the stepwise sequence of the receiving of an individual piece-good unit from a suspended conveyor system in a transfer system according to the invention and the discharge to a secondary conveyor system.

FIG. 4d shows a fourth phase of a transfer process according to the invention. The first conveying unit 30" has now sufficiently raised the individual piece-good unit 2" such that the second conveying unit 60" could be conveyed away unhindered to the right. If a worm drive which is able to move two second conveying units simultaneously is used, as shown in FIGS. 1 and 3, the second conveying unit 60" temporarily remains stationary, since the conveying path for the next second conveying unit 60 to be unloaded is not yet free. The first conveying unit 30 has reached the intended angle of inclination for the transfer.

Figure 4E:
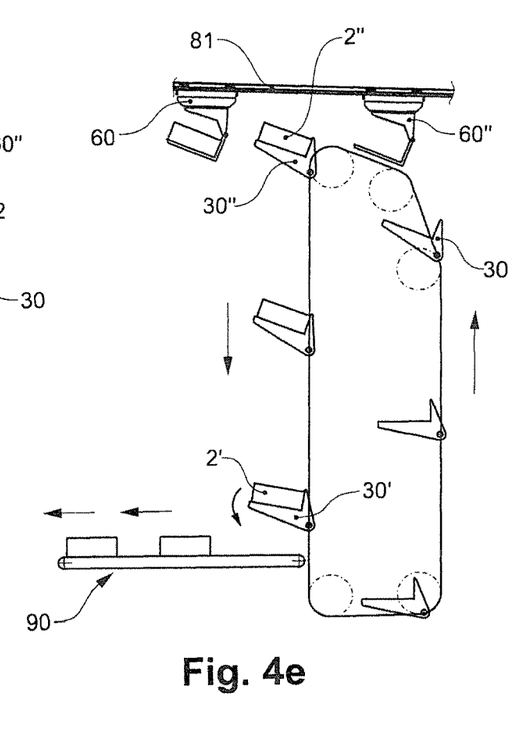
FIG. 4e shows schematically the stepwise sequence of the receiving of an individual piece-good unit from a suspended conveyor system in a transfer system according to the invention and the discharge to a secondary conveyor system.

FIG. 4e shows a fifth phase of a transfer process according to the invention. The first conveying unit 30" begins to be lowered vertically in the direction of the second transfer zone 6. The first conveying unit 30' in the meantime reaches the second transfer zone 6. Due to the correspondingly designed control guide (not shown) the rack of the first conveying unit 30' starts to be inclined in the direction of the horizontal.

Figure 4F:
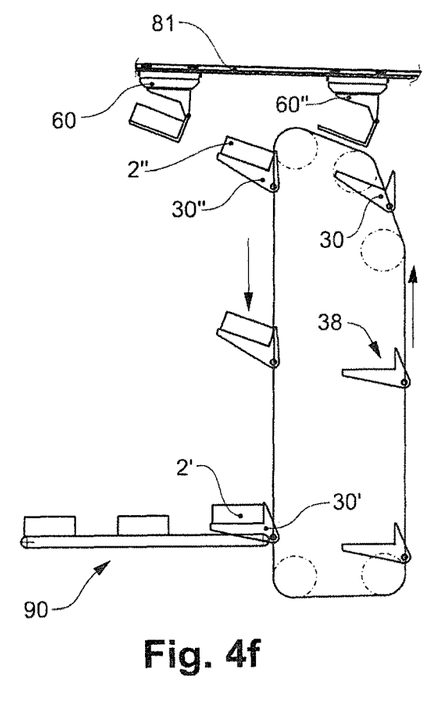
FIG. 4f shows schematically the stepwise sequence of the receiving of an individual piece-good unit from a suspended conveyor system in a transfer system according to the invention and the discharge to a secondary conveyor system.

FIG. 4f shows a sixth phase of a transfer process according to the invention. The rack of the first conveying unit 30' is now aligned horizontally and penetrates by meshing the belt conveyor 90 consisting of a plurality of parallel belt conveyors. Before the individual piece-good unit 2' has reached the belt conveyor 90, the belt conveyor is stopped temporarily.

Figure 4G:
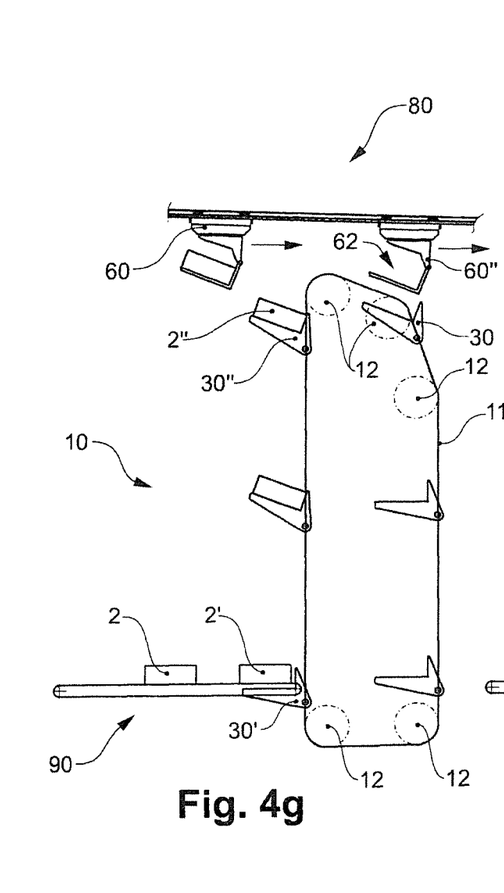
FIG. 4g shows schematically the stepwise sequence of the receiving of an individual piece-good unit from a suspended conveyor system in a transfer system according to the invention and the discharge to a secondary conveyor system.

FIG. 4g shows a seventh phase of a transfer process according to the invention. The first conveying unit 30" is now located sufficiently far down that the conveying path for the next second conveying unit 60 to be unloaded is free. This next second conveying unit is now moved into the first transfer zone 5 and at the same time the empty second conveying unit 60" is moved out of the first transfer zone 5. In order to keep the conveying path of the second conveying units 60, 60" free, the transfer conveying device 10 is temporarily stopped. The horizontal rack of the first conveying unit 30' has already penetrated by meshing the stationary belt conveyor 90 and at the same time deposited the individual piece-good unit 2' onto the horizontal belt conveyor 90.

Figure 4H:
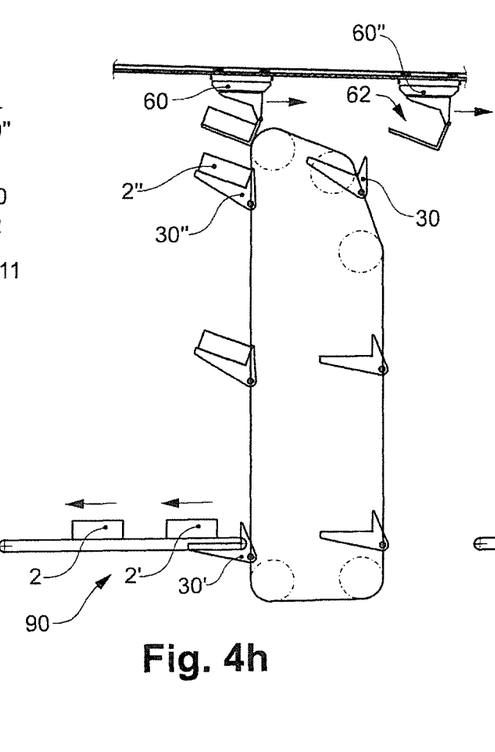
FIG. 4h shows schematically the stepwise sequence of the receiving of an individual piece-good unit from a suspended conveyor system in a transfer system according to the invention and the discharge to a secondary conveyor system.

FIG. 4h shows an eighth phase of a transfer process according to the invention. The belt conveyor 90 continues with the conveyance and transports the deposited individual piece-good unit 2' out of the second transfer zone 6. The empty second conveying unit 60" has left the first transfer zone 5 and is supplied by the suspended conveyor system 80 for further use.

Figure 4I:
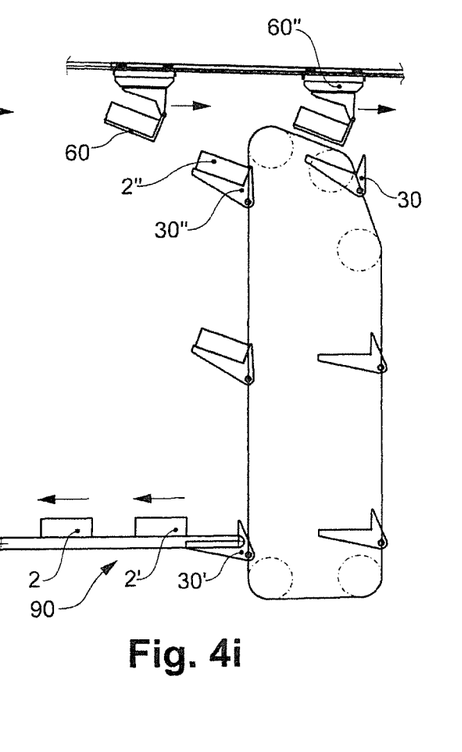
FIG. 4i shows schematically the stepwise sequence of the receiving of an individual piece-good unit from a suspended conveyor system in a transfer system according to the invention and the discharge to a secondary conveyor system.

FIG. 4i shows a ninth phase of a transfer process according to the invention. The second conveying unit 60 has reached the transfer position and is fixed. The transfer conveying device 10 starts up again. This ninth phase corresponds to the first phase of FIG. 4a. The transfer cycle is completed.

In the phases of FIG. 4g, 4h the transfer conveying device 10 is stationary, whilst in the phases of FIGS. 4a to 4f it is running. This does not mean, however, that the conveying speed has to be constant. Advantageously, in each case the conveying speed is reduced at the time of a transfer in order to achieve a gentler receiving and/or transfer of an individual piece-good unit, particularly advantageously the conveying speed reduces to zero at the moment of the transfer.

If individual piece-good units are to be received by a belt conveyor 90 and supplied into the suspended conveyor system, the phases run in reverse sequence. The conveying direction of the first conveying units of the transfer conveying device 10 is reversed (counterclockwise in the example shown) whilst the conveying direction of the second conveying units is the same (from left to right in the example shown).

An individual piece-good unit 2' supplied from the belt conveyor 90, for example a stack of book blocks from a digital printing machine, is ready to be received in the second transfer zone 6 on the stationary belt conveyor 90 (FIG. 4g). The first conveying unit 30' penetrates by meshing the belt conveyor 90 and receives the individual piece-good unit 2' (FIG. 4f). The rack of the first conveying unit 30' is inclined from the horizontal to the rear (FIG. 4e). The first conveying unit 30" has reached the first transfer zone 5 and moves from top left toward the prepared empty second conveying unit 60" (FIGS. 4d, 4c). The first conveying unit 30" has reached the second conveying unit 60" and the racks of the two conveying units 30", 60" form a common bearing surface on which the individual piece-good unit 2" is located (FIG. 4b). The first conveying unit 30" has deposited the individual piece-good unit 2" on the second conveying unit 60" and is conveyed further such that the conveying path for the now loaded second conveying unit 60" and the next second conveying unit 60 to be filled is free (FIG. 4a). The transfer conveying device 10 is stopped (FIGS. 4a, 4i). A new individual piece-good unit is conveyed from the belt conveyor 90 into the second transfer zone 6. The loaded second conveying unit 60" is conveyed out of the first transfer zone 5 and a second conveying unit 60 is supplied (FIG. 4h). When the individual piece-good unit has reached the transfer position, the belt conveyor 90 is stopped (FIGS. 4a, 4h). The transfer conveying device 10 starts up again. The transfer cycle starts all over again (FIG. 4g).

The present invention is not to be understood to be limited in its scope to the specific embodiments described herein. From the description and the accompanying figures, various further modifications of the present invention that also fall within the protective scope of the claims are evident to the person skilled in the art, in addition to the examples disclosed herein. Additionally, different references are quoted in the description, the disclosure thereof being included herewith in their entirety in the description by way of reference.

It is claimed:

1. A system for transferring individual piece-good units to and/or from conveying units of a rail-guided suspended conveyor system comprising:
   at least one transfer conveying device with one or more first conveying units, wherein the individual first conveying units have a rack with a plurality of tines, which form a receptacle for bearing an individual piece-good unit; and
   a suspended conveyor system with a plurality of second conveying units, wherein the individual second conveying units have a rack with a plurality of tines, which form a receptacle for bearing an individual piece-good unit;
   wherein the at least one transfer conveying device and the suspended conveyor system are designed such that in a transfer zone, a rack of a first conveying unit of the transfer conveying device and a rack of a second conveying unit of the suspended conveyor system penetrate one another by meshing so that with a movement of the first conveying unit and the second conveying unit relative to one another either an individual piece-good unit initially borne on the rack of the first conveying unit remains on the rack of the second conveying unit, or an individual piece-good unit initially borne on the rack of the second conveying unit remains on the rack of the first conveying unit; and
   wherein in said transfer zone the rack of the first conveying unit penetrates the rack of the second conveying unit from top to bottom in the direction of gravity; and/or the rack of the first conveying unit penetrates the rack of the second conveying unit counter to the direction of gravity from bottom to top.

2. The system as claimed in claim 1, wherein the second conveying units of the suspended conveyor system are able to be conveyed individually, independently of other second conveying units.

3. The system as claimed in claim 1, wherein the first conveying units move along a closed conveying path, wherein a portion of this conveying path corresponds to the transfer zone.

4. The system as claimed in claim 1, wherein the first conveying units move on a conveying path between the transfer zone and at least one further zone.

5. The system as claimed in claim 1, wherein in the transfer zone the conveying path of the first conveying units and the conveying path of the second conveying units run in one plane.

6. The system as claimed in claim 1, wherein the at least one transfer conveying device comprises means for altering the alignment of the rack of a first conveying unit relative to the vertical.

7. The system as claimed in claim 1, wherein the at least one transfer conveying device comprises means for controlling the alignment of the rack of a first conveying unit.

8. The system as claimed in claim 1, wherein the tines of the rack of a first conveying unit are arranged fixedly in terms of rotation on a pivot pin of the first conveying unit; and the transfer conveying device comprises two closed drive chains guided in parallel, rotary bearings opposing one another in pairs being arranged thereon, and in each case a pivot pin of a first conveying unit being rotatably mounted in said rotary bearings.

9. The system as claimed in claim 8, wherein the first conveying units of the at least one transfer conveying device, at one or both ends of the pivot pin of the first conveying units, have a control lever which is operatively connected to the pivot pin and which cooperates with control means of the transfer conveying device.

10. The system as claimed in claim 1, wherein the suspended conveyor system comprises means for altering the alignment of the rack of a second conveying unit relative to the vertical.

11. The system as claimed in claim 1, wherein the suspended conveyor system comprises means for controlling the alignment of the rack of a second conveying unit.

12. The system as claimed in claim 1, wherein the second conveying units of the suspended conveyor system comprise means for the clamped retention of an individual piece-good unit borne therein.

13. The system as claimed in claim 1, wherein the suspended conveyor system comprises means that fix the alignment of the second conveying units relative to the conveying path in a transfer zone of the conveying path of the second conveying units.

14. The system as claimed in claim 1, wherein the tines of the racks of the first conveying units and/or the tines of the racks of the second conveying units in each case form a first wall and a second wall which are located at an angle of <180° to one another.

15. The system as claimed in claim 14, wherein the at least one transfer conveying device is designed such that in at least one region of the conveying paths of the first conveying units and the second conveying units, the first wall of the rack of a first conveying unit is parallel to the first wall of the rack of a second conveying unit.

16. A method for transferring individual piece-good units to and/or from conveying units of a rail-guided suspended conveyor system, comprising the steps:
   providing a transfer system as claimed in claim 1;
   positioning a second conveying unit of the suspended conveyor system in a transfer zone of the conveying path of the second conveying units;
   moving a first conveying unit of the transfer conveying device into a transfer zone of the conveying path of the first conveying units; and
   mutual penetration by meshing of the rack of the first conveying unit and the rack of the second conveying unit;
   wherein for transferring an individual piece-good unit borne on the rack of the first conveying unit onto the rack of the second conveying unit, the rack of the first conveying unit penetrates the rack of the second conveying unit from top to bottom in the direction of gravity; and/or wherein for transferring an individual piece-good unit borne on the rack of the second conveying unit onto the rack of the first conveying unit, the rack of the first conveying unit penetrates the rack of the second conveying unit counter to the direction of gravity from bottom to top.

17. The system as claimed in claim 1, wherein the at least one transfer conveying device is designed such that in at least one region of the conveying paths of the first conveying units and the second conveying units, a first wall of the rack of a first conveying unit is parallel to a first wall of the rack of a second conveying unit.

18. The system as claimed in claim 1, wherein at a moment of a transfer of an individual piece-good unit from one rack to the other rack, the tines of both racks form a common bearing surface.

19. A conveying unit for a rail-guided suspended conveyor system, comprising a first support structure and a second support structure, said second support structure being pivotably mounted to said first support structure via suspensions, and said second support structure bearing a rack for the transport of an individual piece-good unit to be conveyed, the rack comprising a plurality of tines that form a receptacle for bearing the individual piece-good unit to be conveyed, wherein the conveying unit comprises means for the clamped retention of an individual piece-good unit conveyed in the receptacle.

* * * * *